H. O. CHUTE.
MANUFACTURE OF ALCOHOL AND BY-PRODUCTS AND APPARATUS THEREFOR.
APPLICATION FILED JAN. 18, 1910.
963,275.
Patented July 5, 1910.
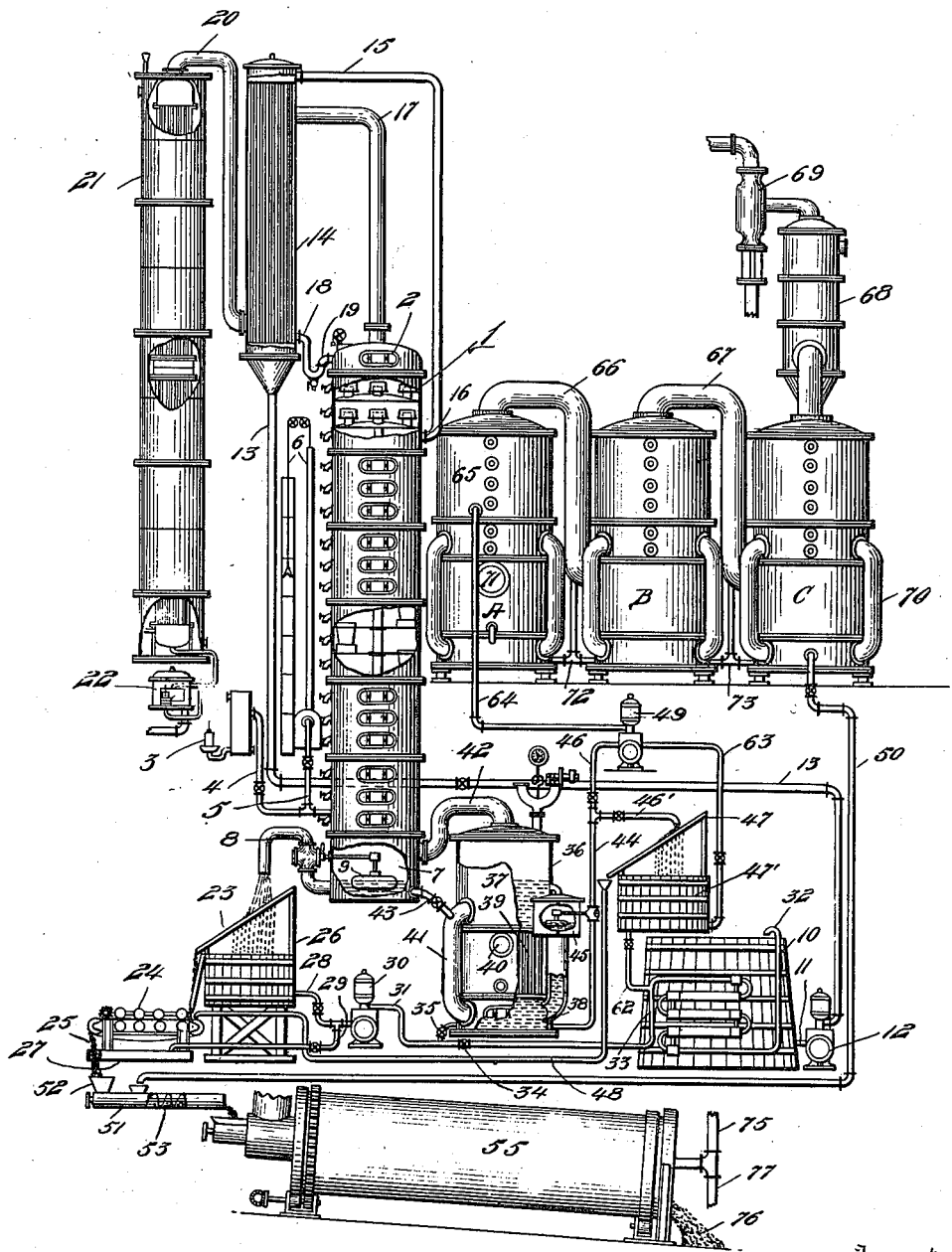

UNITED STATES PATENT OFFICE.

HARRY O. CHUTE, OF NEW YORK, N. Y.

MANUFACTURE OF ALCOHOL AND BY-PRODUCTS AND APPARATUS THEREFOR.

963,275.  Specification of Letters Patent.  Patented July 5, 1910.

Application filed January 18, 1910. Serial No. 538,673.

*To all whom it may concern:*

Be it known that I, HARRY O. CHUTE, a citizen of the United States, residing at New York, in the county of New York and State of New York, have invented certain new and useful Improvements in the Manufacture of Alcohol and By-Products and Apparatus Therefor, of which the following is a specification.

This invention relates to the manufacture of alcohol and by-products and apparatus therefor; and it comprises a method of recovering the valuable constituents of corn and other grains and alcohol yielding materials in the form of ethyl alcohol and concentrated by-products wherein such materials are fermented under certain conditions, said conditions involving the use of part of the slop or dealcoholized residue of a former operation in making the fermented mash, and are then distilled by the aid of heating vapors generated from the liquid residue of distillation, said liquid residues after the concentration incident to furnishing such vapors being afterward further concentrated; and it also comprises an assemblage of apparatus elements useful in the performance of the said method, said assemblage or organization of apparatus elements comprising a fermenting vessel, a counter-current chambered still deriving fermented liquid therefrom, a boiler or boiling apparatus deriving liquid from said still, directly or indirectly and returning heating vapor thereto, means for also returning liquid from the still to the fermenting vessel, means for separating solids and liquids in slop from the still and means for producing a further concentration of liquid drawn from the boiling device; all as more fully hereinafter set forth and as claimed.

In the manufacture of ethyl or grain alcohol from grain, molasses, etc., for potable spirits, cologne spirits, denatured alcohol, etc., it is customary to prepare a saccharine solution of comparatively limited strength for fermentation since the yeast organism does not flourish well when the percentage of alcohol rises too high. In fermenting corn, for instance, the mash is often made about 40 gallons per bushel. In making this mash, a portion of liquid after distilling off alcohol is often returned to serve in lieu of water as certain advantages in the fermenting operation are thus gained. This practice of returning a portion of the liquid from which alcohol has been removed, or "slop" in the art is called "slopping back." In fermenting for alcohol the lactic bacteria, which are invariably present, convert a portion of the saccharine matter into lactic acid, the lactic fermentation going on until the liquid acquires a certain acidity when further formation of lactic acid stops. At this degree of acidity not only is the activity of the lactic bacteria arrested but also that of other bacteria while the action of yeast is not much affected. It is therefore desirable to slop back a portion of the acid slop and furnish preformed lactic acid rather than form new lactic acid by acid fermentation at the expense of the saccharine matter. Certain changes are also effected in the quality of the potable spirits by "slopping back."

After the fermentation the product is called "beer" in this country. This beer is distilled in some form of counter current chambered still heated by introduction of steam at its base; a form of still known as a beer still in the art. Sometimes a "charge still" is employed, charges of beer being introduced into the uppermost of three or four superimposed chambers down through which it passes to emerge at the base as slop, or dealcoholized liquid. Until recently it has been customary to heat both types of still by the use of directly injected steam, this steam coming either directly from the steam boiler or from the exhaust of pumps, engines, etc. Lately (Patent 896,434) the use of a special vapor generator producing vapor from the liquid of the base of the still has been introduced.

The cost of producing a gallon of grain alcohol is of course a composite figure dependent upon the price of grain, the expense of the operation and the compensating returns which may be derived from by-products; and it is the object of the present invention to diminish such cost by devising a regulated procedure in the operation of alcohol plants.

The by-products obtained in making alcohol have not hitherto generally been regarded as of much value. In early days the slop from the stills ran to waste and it is often so disposed of now, at least in part though some is fed to cattle. It is quite common to strain the slop, feed all or most of the thin strainings to cattle and run the residue to waste, the thicker material on the screen being dried and sold as distillers' grains. Recently, however, it has been possible to utilize the whole slop, recovering all its solids, both the solids in solution and those in suspension, in the form of a dry rich cattle feed. This feed is very rich since it contains practically everything which was in the original grain save the starch which has been fermented and removed as alcohol. It is substantially a concentrated grain, very rich in proteids and valuable feed materials; and well adapted to be fed in connection with roughage such as corn stalks, coarse hay, etc. (to replace the missing starch) as a complete feed.

The present invention is concerned with a systematic method of and apparatus for carrying out a process of this general type, wherein the procedure is simplified and made more economical.

For the purposes of the present invention, it may be assumed as a basis of calculation that 40 gallons of beer are made from a bushel of corn, it being understood that the same principles will apply where the quantity is made somewhat greater or somewhat less, and where other starchy or saccharine materials are used in lieu of corn.

In distilling the 40 gallons of beer in the still with the aid of injected heating vapors, it may be assumed that 4 gallons of high wines of 125° proof will be made and the volume thereby reduced to 36 gallons. But as in order to produce this amount it is necessary to inject steam corresponding to 8 gallons of condensed water, the total volume of the slop thereby becomes 44 gallons. On screening the slop or filter-pressing it, the volume of liquid becomes about 42 gallons because of the volume of solids and adhering liquid removed. In slopping back, it is practicable to return about half the slop to the fermenting vessels, or, in this case, 22 gallons. Slopping back 22 gallons, the residual liquid is 20 gallons. This may be evaporated in a multiple effect or other apparatus, to a heavy syrup, yielding about 3 gallons of such syrup. This syrup may be admixed with the solids separated by straining or filter pressing and the mixture dried to produce the described rich feed or concentrated grain.

In reducing the 20 gallons to 3 gallons, the net evaporation is 17 gallons. It is one of the objects of the present invention to reduce this evaporative duty of the multiple effects by a systematic rearrangement of conditions thereby reducing the cost of the feed and concomitantly cheapening the cost of producing alcohol. Assuming an evaporator to have an evaporative capacity of 2500 gallons per hour and to be evaporating 17 gallons of liquid per bushel of corn treated, it follows that such an evaporator would handle the product from 147 bushels of corn per hour. Now by attaching a special vapor generating device to the base of the still and forming the vapors necessary for the operation of the still from the slop itself, it is obvious that the 8 gallons of foreign water introduced by boiler steam no longer occur. The 40 gallons of liquid freed of 4 gallons high wines becomes 36 gallons of slop containing the same amount of solids, in solution and in suspension, as the 44 gallons of the usual practice. This liquid on separation of solids by screening or pressing becomes reduced to 34 gallons, of which 18 gallons (half the original quantity) can be slopped back, leaving 16 gallons to be handled in the evaporator and reduced to 3 gallons of syrup by the evaporation of 13 gallons of moisture. In other words the evaporative duty of the multiple effect is reduced from 17 gallons to 13 so that with a given apparatus the slop from a larger plant can be handled, or with a given plant a smaller apparatus is all that is necessary. A multiple effect of the given size able to handle the liquid product from 147 bushels of grain under the old system can deal with the product from 192 bushels per hour when operating as just described. But in the preferred form of the present invention the conditions are still further modified.

The still is run by the heat of vapors condensed therein but these vapors are derived by boiling a previous portion of slop and the slop removed from the base of the still is of the same dilution as that produced under the old system of directly injecting boiler or engine steam into the still since the amount of vapor so used and derived from slop is the equivalent of the amount of such steam so injected, so that in the slop there is no greater or less amount of soluble solids than in the slop produced in the old process and the same total amount of slop may be slopped back as before, the only concentration being in the portion of slop going through the vapor generating device. In the preferred form of the present invention therefore I divide the slop from the still into two portions, one portion being used for slopping back and the other portion being used for the vapor generating device or boiler. In the practice of this preferred form, the slop may or may not be strained before passing into the vapor generating device. In using strained slop in this preferred method the details of operation are as follows: the still is run by the aid of vapors produced in the vapor generator from a previously filtered portion of slop and these vapors condensing in the still give, as before, a diluted slop of 44 gallons in the base chamber of the still, so that no conditions in such base are changed. The 44 gallons are removed from the base of the still and strained or otherwise mechanically separated. Of this quantity, 2 gallons are taken out in the grains, 22 gallons slopped back and the residual 20 gallons sent to the vapor generator where 8 gallons are converted into vapor and returned to the still to heat it, leaving 12 gallons of concentrated liquid. This 12 gallon quantity on evaporation in the multiple effect forms, as before, 3 gallons of syrup to be mixed with the grains and loses 9 gallons of water by evaporation. In other words, the evaporation required of the triple effect is reduced from 17 gallons as in the first example or 13, as in the second, to 9 gallons per bushel. The stated triple effect having an hourly capacity of 2500 gallons is now able to handle the liquid product from 277 bushels of corn per hour instead of merely that from 147 bushels as in the first computation. In this preferred form, it is not necessary that the slop used for furnishing vapors be strained although it is better.

When using whole or unstrained slop, only that portion of the slop used for slopping back is taken from the still to the screens while another portion is fed directly from the base of the still to the vapor generator, concentrated, screened and sent to the evaporators. It will be noted that in this operation, the portion of the slop used for slopping back is taken directly from the base of the still without concentration and does not go to the concentrator or vapor generator or to the evaporators while another distinct portion is used to furnish heating vapor to run the still and to become concentrated thereby and this portion then goes to the evaporators. In other words, a dilute slop is used for slopping back and a concentrated slop is sent to the evaporators.

Apart from the economical advantages offered by the process just described, it offers the further advantage that there is provided for the slopping back operation a slop of the usual concentration so that no changes are requisite in the usual practice of this operation as is the case where the operation is so carried on as to produce 36 gallons of slop. Nor is the usual process in the still changed, the concentration of the liquids passing therethrough being the same, except by deriving the heat from a different source: from the vapors from slop in lieu of from foreign steam. This modification of the process has however the further advantage over the use of foreign steam in that the taste and odor of the potable spirit produced are not affected, as is apt to be the case where boiler steam or exhaust steam is employed.

Using the described principle of operating the still by vapors generated from a portion of slop, and thereby concentrating such portion, while slopping back the residue of the slop, many arrangements and organizations of apparatus elements may be made within the scope of my invention. In the accompanying illustration I have shown, more or less diagrammatically, one such organization of apparatus elements within my invention. In this showing the figure represents the combination of a still, a fermenter, a drier and an evaporator with suitable pipe connections and heating devices for performing the described methods. Element 1, as shown, is a continuous flow countercurrent beer still provided with the usual perforated plates or inverted cups or any of the other devices used in fractionating stills. Manholes 2 permit access to the shelves. Tester 3, communicating with the still through connection 4 permits observation of the operation of the still while pipe 5, communicating with pressure gage 6, permits the pressure, and therefore the temperature, within the still to be followed. At its base the still is provided with a chamber 7 receiving the dealcoholized liquid or slop. Pipe 8, controlled by float mechanism 9 allows withdrawal of slop from the base of the still. Beer is produced in fermenter 10 and withdrawn through pipe 11 by pump 12, and passed upward through pipe 13 to and through a preheater 14 of an ordinary type. From the preheater the beer, now warmed by outgoing alcoholic vapors from the still, is sent into the still through pipe 15 and connection 16. Alcohol vapors leave the head of the still through pipe 17, and pass through the preheater. The condensed poorer portions are returned to the still through pipe 18 and connection 19. The alcohol vapors which are not condensed in the preheater go forward through pipe 20 into a condenser 21 of an ordinary type. The condensed high wines are removed through the usual device 22. Going back now to the slop withdrawn from the base of the still to the described device, this flows over a screen 23 which separates it into solid portions or grains and liquid. The grains go forward, as shown, to and through a continuous press 24 emerging in a compressed and absorbent state at 25. The liquid going through the screen is received in tank 26, while that from the press is received in tank 27. Both portions of liquid are withdrawn, respectively through pipes 28 and 29 by means of pump 30 and are sent forward through the system through pipe 31. Pipe 31 allows the introduction of a portion of this liquid into the fermenting tub at 32, having gone through the usual slop cooler 33. This pipe is valved at 34 and communicates with another valved pipe 35 leading into the base of the boiler or heater 36. This heater, as shown, comprises an upper vapor chamber 37 and a lower chamber 38 communicating through the tubes of a tube nest 39. Steam is introduced around these tubes through 40. In order to produce circulation of the liquid in the boiler the latter is provided with external pipes 41 which serve for downward circulation of liquid, such circulation being aided by the cooling action of the air. The vapor generated in the boiler is led into the base of the still through conduit 42, and serves to heat such still and cause it to operate.

Communication between the liquid in the still and that in the boiler may be afforded by the valved pipe 43. Tapping the base of the boiler is a liquid outlet line 44 allowing the withdrawal of slop concentrated by such formation of vapor and sending it forward through the system. The flow of liquid through this liquid line may be controlled by float mechanism 45 governed by the level of the liquid in the boiler. Tapping this line are two valved pipes 46 and 46'. The latter allows the concentrated liquid to be delivered to a screen 47 above a tank 47'. Solid matters remaining on the screen may be delivered by a pipe 48 back to the roller press. Pump 49 takes liquid from pipe 46 and sends it forward to the evaporators. The evaporating device as here shown is a triple effect having three effects lettered, respectively, A, B and C. Pipe 50 is for returning syrup produced in the multiple effect to the mixing device 51 where it is joined by the grains from the roller press coming through hopper 52. Screw conveyer 53 serves to produce a thorough admixture. The mixture is sent by the conveyer into an ordinary type of drier 55, where it is dried to substantial dryness and becomes a cattle food. The thin liquid coming from tank 47' may be delivered by 62 into the fermenting vat or sent forward by pipe 63 and pump 49, to the multiple effect through pipe 64, entering evaporator A at 65. The multiple effect has the customary connections 66 and 67 allowing the vapors from a preceding effect to be used for heating a succeeding effect.

The apparatus is provided with the customary waterleg connection 68 and suction producing device 69, here shown as an injector apparatus. The several effects are provided with air-cooled external circulating pipes 70, similar to those used in the boiler. Steam for heating the first effect is admitted through 71. Connections 72, and 73 permit transfer of liquid from one effect to another. The drier (55) may be heated by steam admitted through 75. Dry feed is discharged at 76. Condensed water from the heating means is discharged at 77.

The apparatus shown may be used in a variety of ways within the scope of the present invention. In one method all the slop from 7 passes through 8 to screen 23 where the thick solid portions are screened out and sent to the roller press 24. The liquid from the tanks 26 and 27 is removed by pump 30 and discharged through pipe 31, a portion going to the boiler 36 through a valved pipe 35 while the residue goes through pipe 31 and slop cooler 33 back to the fermenting tank. The portion of the slop which is sent into the boiler 36 is boiled by steam and generates vapor passing through neck 42 into the base of the still. The slop concentrated by the boiling operation passes through 44 and pump 49 into the evaporator A where it is evaporated in the ordinary fashion, passing successively from A to B and C, whence it emerges through 50 as a strong syrup which is delivered to mixer 51 and there admixed with the coarse solids coming from the roller press. The mixture is dried in 55 until it is "bone dry." In this operation the valve in pipe 46' is closed, as is also the valve in 43.

In another mode of operation the portion of slop which is to be slopped back is withdrawn through 8 and strained at 23, and thence returned direct to the fermenting tank, the valve in 35 being closed. Another portion of the slop is removed from the still through 43 and introduced into boiler 36 where it is boiled as before to furnish vapor for running the still. The concentrated whole slop thus obtained is transferred by 44 and 46' to screen 47 where the insoluble solids are removed and transferred by 48 to the roller press. The concentrated thin liquid thus obtained in 47' may be transferred by 63 and pump 49 to the evaporators, the valve in 62 being closed.

The method just described has the economical advantages of method No. 1, but requires two separate strainings. But it is convenient where the slop drying plant and roller press are located, as is often the case, in a remote portion of the plant. In the previously described method a conduit must of course be provided taking all the slop from the still to the slop house where the screening is done, with another conduit returning strained slop back to the boiler and still a third conduit from the stillhouse to the multiple effects which are usually located in the slop house.

In a third method all the slop from the still may be taken through 43 into the boiler and there concentrated, 43 being opened intermittently as the needs of the boiler require, furnishing steam for running the still as before. The concentrated whole slop taken from the boiler by 44 may be sent by 46', the valve in 46 being closed, to the strainer 47. Of the concentrated liquid slop in tank 47 a portion may be slopped back by 62 and the residue transferred through 63 to the evaporators. Where it is desired to produce a concentrated slop without dilution by any steam, the valve in 43 may be left open so that all the liquid from 7 passes through 36. In this method of operation for 40 gallons of liquid led into the still but 36 gallons of slop will be produced.

While I have mentioned corn particularly and referred to grain alcohol it must be understood that the fermentation of any substance for the production of ethyl alcohol is within the scope of my invention provided there are valuable non-volatile constituents in the slop which may be used in a concentrated state. For example, when fermenting molasses after the alcohol is removed the slop may be concentrated producing a viscous mass or syrup from the gummy matters which do not ferment, and these are valuable as a core-compound cement in foundry practice. Moreover, it is possible to economically extract the glycerin from the portion of slop which is concentrated in my process. Or this concentrated slop may be fed to cattle with more advantage than the thin slop. In distilling fruits and vegetable refuse for denatured alcohol the present process gives a valuable concentration of solids.

It is better to employ a boiler or vapor generating device which is, like that shown, structurally separate from the still and not integral therewith since a better opportunity for the control of the conditions is afforded, by making the boiler a separate element. In the device shown, the feed of liquid to the boiler is independent of the discharge of slop from the still, which discharge may be governed by the usual automatic devices without relation to the demands of the boiler.

In lieu of straining the slop from the still, it may be settled, spun in a centrifugal, filter-pressed or otherwise treated to separate it into "thin slop" and "thick slop," the particular method of separating the insoluble solids from the liquid not being material to this invention. The "thick slop" may be a fairly consistent mass or a magma thin enough to flow through a pipe; or may be a press cake. The thin slop, or the liquid portion may be transparent or may be milky from the presence of unseparated insoluble solids. The degree of separation of liquids and solids is a matter of convenience.

What I claim is:—

1. The process of recovering valuable products from grain which comprises fermenting such grain in the presence of returned slop, distilling off the alcohol from the fermented liquid in such manner as to produce a slop of greater volume than that of the fermented liquod treated, separating said slop into liquid and solid fractions, returning a portion of the liquid to serve in fermenting more grain, evaporating the other portion of the liquid to a syrup, part of the vapors produced in such evaporation being used to effect the distilling, admixing such syrup with the separated solids and drying the mixture.

2. The process of recovering valuable products from grain which comprises fermenting such grain in the presence of returned slop, distilling off the alcohol from the fermented liquid by vapor generated from a selected portion of the slop, separating the slop into liquid and solid portions, returning a portion of the liquid to serve in fermenting more grain, employing the other portion to furnish such vapor, evaporating the residue of liquid therefrom to a syrup, admixing such syrup with the separated solids and drying the mixture.

3. The process of recovering valuable products from grain which comprises fermenting such grain in the presence of returned slop, distilling off the alcohol from the fermented liquid by vapor generated from thin slop, separating the slop into liquid and solid portions, returning a portion of the liquid portion to serve in fermenting more grain, boiling the residual portion of liquid to furnish such vapor for the distillation, and evaporating the boiled portion to a syrup.

4. In the manufacture of alcohol, the process which comprises fermenting grain in the presence of returned slop, distilling off the alcohol with the aid of vapors generated from slop, dividing the slop from such distillation into two portions, returning one such portion to aid in further fermentation and isolating the other portion and boiling it to furnish such vapors.

5. In an apparatus for the manufacture of alcohol, the combination, with a still arranged to distil off alcohol and having a slop-outlet, separating means for removing solids from the still-slop to produce a thin slop, and means for conveying still-slop from the slop-outlet of the still to said separating means, of a fermenting vessel, means for conveying a part of the thin slop from the separating means to the fermenting vessel, means for conveying beer from the fermenting vessel to the still, a vapor generator for concentrating slop, means for conveying a part of the thin slop from the separating means to the generator, connections between the generator and the still whereby vapor from the thin slop is conducted to the still, a multiple effect, and means for conveying concentrated slop from the generator to the multiple effect.

6. In an apparatus for the manufacture of alcohol, the combination with a still arranged to distil off alcohol and having a slop-outlet, separating means for removing solids from the still-slop to produce a thin slop, and means for conveying still-slop from the slop-outlet of the still to said separating means, of a fermenting vessel, means for conveying a part of the thin slop from the separating means to the fermenting vessel, means for conveying beer from the fermenting vessel to the still, a vapor generator for concentrating slop, means for conveying a part of the thin slop from the separating means to the generator, connections between the generator and the still whereby vapor from the thin slop is conducted to the still, a multiple effect, means for conveying concentrated slop from the generator to the multiple effect, and means for combining the syrup from the multiple effect with the solids removed by the separating means.

7. In an apparatus for the manufacture of alcohol, the combination, with a still arranged to distil off alcohol and having a slop-outlet, separating means for removing solids from the still-slop to produce a thin slop, and means for conveying still-slop from the slop-outlet of the still to said separating means, of a fermenting vessel, means for conveying a part of the thin slop from the separating means to the fermenting vessel, means for conveying beer from the fermenting vessel to the still, a device for concentrating slop, means for conveying a part of the thin slop from the separating means to the device, connections between the device and the still whereby vapors from the thin slop are conducted to the still, a multiple effect, means for conveying concentrated slop from the device to the multiple effect, means for combining the syrup from the multiple effect with the solids removed by the separating means, and a drier for the combined syrup and solids.

8. In an alcohol plant, a column still provided with means for heating by introduced heating vapors, means for separating slop from the still into solid and liquid portions, a fermenting apparatus, means for delivering fermented liquid therefrom to the still, means for slopping back a portion of the liquid slop from the still to the fermenting apparatus and evaporating means for concentrating the residue of the liquid slop in a plurality of stages, the apparatus performing the first of said stages being arranged to deliver heating vapors to said still.

9. In an alcohol plant, a countercurrent still, means for supplying fermented liquid thereto, means for returning a portion of the slop from the base of the still to the fermenting means and means for concentrating the rest of the slop to furnish a syrup, such concentrating means including a vapor generating device supplying heating vapor to the still.

10. In the art of making alcohol, the process which comprises producing a fermented mash with the aid of returned slop, distilling such mash in a still with the aid of heating vapors generated from slop, removing slop from the base of the still, boiling a portion of such slop to furnish such vapors, and returning a portion of the unboiled slop to aid in the fermenting operation.

11. In the art of making alcohol, the process which comprises producing a fermented mash with the aid of returned slop, distilling alcohol from the mash in a still with the aid of heating vapors derived from a portion of slop and dividing the slop from the base of the still into two portions, one of which after separating insoluble solids is returned to aid in the fermenting operation while the other is diverted into a vapor generating apparatus to furnish vapors for introduction into such still.

12. In the art of making alcohol, the process which comprises producing a diluted slop in a still with heating vapors derived from slop, dividing such slop into two portions, diverting one portion for other uses and heating the other portion to furnish such vapors.

13. The process of making alcohol which comprises distilling off alcohol from a fermented liquid by vapor generated from thin slop, removing the slop produced from the still, mechanically separating the insoluble solids to produce thin slop and boiling a portion of the thin slop so produced to furnish heating vapors to conduct the distilling operation.

14. In the art of making alcohol, the process which comprises producing a fermented mash with the aid of returned slop, distilling alcohol therefrom with the aid of heating vapors generated from slop and thereby producing a diluted slop in the still, removing the diluted slop from the base of the still, mechanically separating such slop into thinner and thicker portions, returning a portion of the thinner material to aid in the fermenting operation and boiling the residue to concentrate the same and furnish heating vapors for the distilling operation.

15. In the art of making alcohol, the process which comprises producing a fermented mash with the aid of returned slop, distilling alcohol therefrom in a still with the aid of heating vapors generated from slop, removing the exhausted slop from the base of the still, returning a portion of such slop after freeing from suspended solids to aid in the fermenting operation and generating heating vapors from the residue of the slop to aid in the distilling operation.

16. In an alcohol plant, a fermenting device, a chambered column still having a base chamber and receiving fermented liquid from said device, a boiler having a vapor connection to said chamber and means for supplying a portion of the slop from such base chamber to the fermenting device and another portion to the boiler.

17. In an alcohol plant, a fermenting device, a chambered column still having a base chamber and receiving fermented liquid from said device, a boiler having a vapor connection to said chamber, means for supplying a portion of the slop from such base chamber to the fermenting device and another portion to the boiler, and means for separating the slop into liquid and solid portions.

18. In an alcohol plant, a fermenting device, a chambered column still having a base chamber and receiving fermented liquid from said device, a boiler having a vapor connection to said chamber, means for supplying a portion of the slop from such base chamber to the fermenting device and another portion to the boiler, means for separating the slop into liquid and solid portions, and means for further evaporating the liquid from such boiler.

19. In an alcohol plant, a fermenting device, a chambered column still having a base chamber and receiving fermented liquid from said device, a boiler having a vapor connection to said chamber, means for supplying a portion of the slop from such base chamber to the fermenting device and another portion to the boiler, means for separating the slop into liquid and solid portions, and means for further evaporating the liquid from such boiler in a plurality of stages.

In testimony whereof, I affix my signature in the presence of witnesses.

HARRY O. CHUTE.

Witnesses:
 FRANK L. RANDEL,
 ROSE MEYERS.